United States Patent
Zimmer

(10) Patent No.: US 7,559,230 B2
(45) Date of Patent: Jul. 14, 2009

(54) METHOD AND DEVICE FOR ANALYZING THE COMBUSTION NOISE IN A CYLINDER OF AN INTERNAL COMBUSTION ENGINE

(75) Inventor: Christian Zimmer, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 3 days.

(21) Appl. No.: 10/595,521

(22) PCT Filed: Oct. 12, 2004

(86) PCT No.: PCT/EP2004/052514

§ 371 (c)(1),
(2), (4) Date: Dec. 12, 2007

(87) PCT Pub. No.: WO2005/042952

PCT Pub. Date: May 12, 2005

(65) Prior Publication Data

US 2008/0190185 A1 Aug. 14, 2008

(30) Foreign Application Priority Data

Oct. 28, 2003 (DE) ................. 103 50 180

(51) Int. Cl.
*G01M 15/00* (2006.01)
(52) U.S. Cl. ................................... 73/35.04
(58) Field of Classification Search ............... 73/35.01, 73/35.03, 35.04, 35.05
See application file for complete search history.

(56) References Cited

U.S. PATENT DOCUMENTS

| | | | |
|---|---|---|---|
| 6,196,184 B1 | 3/2001 | Przymusinski et al. | 123/299 |
| 6,390,068 B1 | 5/2002 | Hartke et al. | 123/479 |
| 7,040,285 B2 * | 5/2006 | Kato et al. | 123/406.37 |
| 2006/0129307 A1 * | 6/2006 | Yasui | 701/114 |
| 2008/0051981 A1 * | 2/2008 | Naber et al. | 701/111 |

FOREIGN PATENT DOCUMENTS

| | | |
|---|---|---|
| DE | 4312587 | 10/1994 |
| DE | 19612180 C1 | 3/1997 |
| DE | 19844746 C1 | 4/2000 |
| EP | 0890021 B1 | 3/1997 |
| GB | 2277173 | 10/1994 |
| JP | 2000054907 | 2/2000 |
| WO | WO 9917010 | 4/1999 |

OTHER PUBLICATIONS

International Search Report and Written Opinion; PCT/EP2004/052514; 18 Pgs, Feb. 8, 2005.

* cited by examiner

*Primary Examiner*—Hezron Williams
*Assistant Examiner*—Gunnar J Gissel
(74) *Attorney, Agent, or Firm*—King & Spalding L.L.P.

(57) ABSTRACT

When detecting the combustion noise on a combustion engine (10) by using a knock sensor (14), the problem arises in that prior art methods cannot determine with sufficient accuracy how much fuel reaches the cylinder (11) of the combustion engine (10) during a specified injection pulse. For different reasons, e.g. for minimizing the fuel consumption or for optimizing exhaust emissions, a multiple injection with, in part, the smallest quantities of fuel is commonly used in today's combustion engines (10) that require a precise fuel metering. To this end, the measuring window (M) for detecting the combustion noises of an individual injection pulse with regard to its starting and/or ending position is variably formed according to operating parameters so that only the combustion noises taken into consideration are detected that serve as a measure for the injected quantity of fuel.

16 Claims, 3 Drawing Sheets

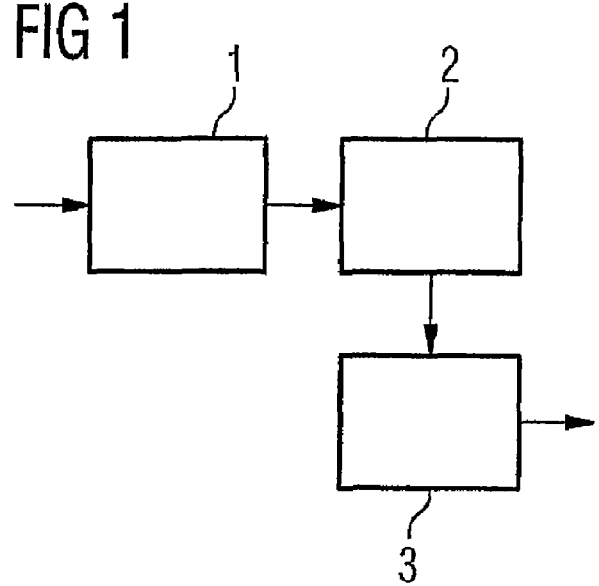
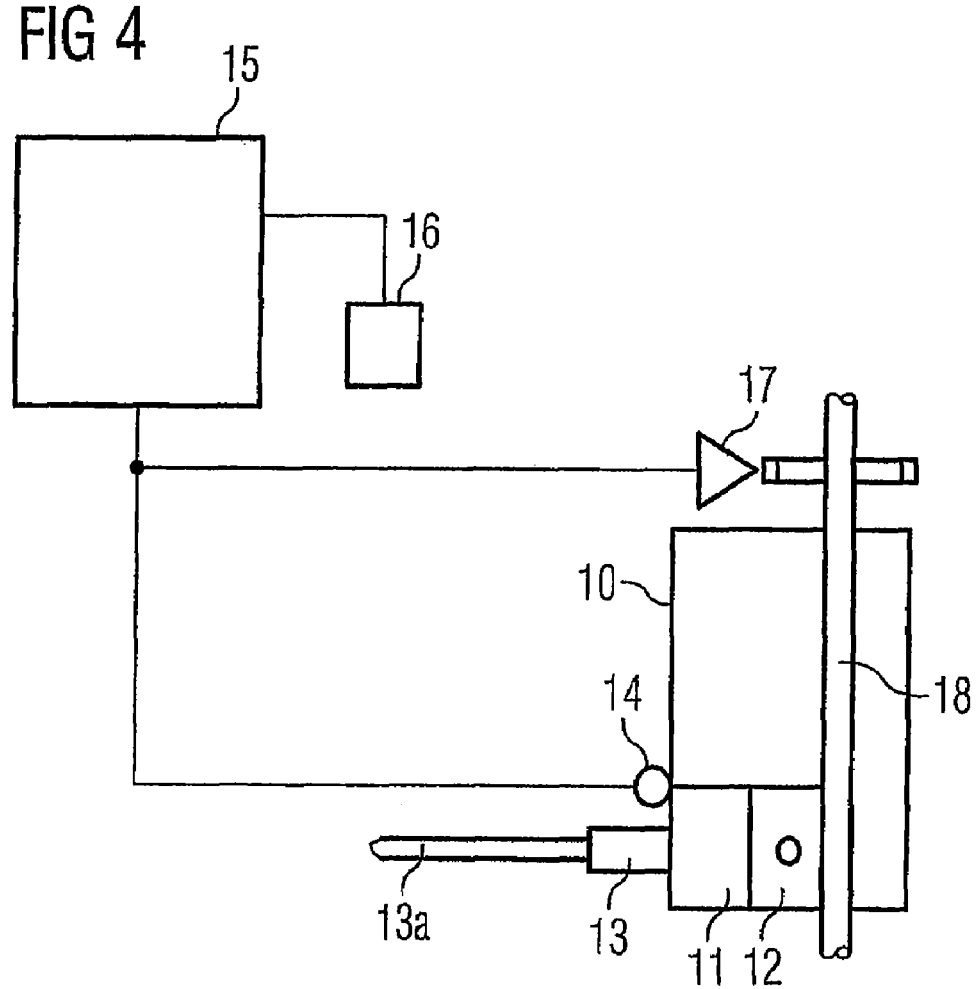

METHOD AND DEVICE FOR ANALYZING THE COMBUSTION NOISE IN A CYLINDER OF AN INTERNAL COMBUSTION ENGINE

CROSS-REFERENCE TO RELATED APPLICATIONS

This application is a U.S. national stage application of International Application No. PCT/EP2004/052514 filed Oct. 12, 2004, which designates the United States of America, and claims priority to German application number DE 103 50 180.0 filed Oct. 28, 2003, the contents of which are hereby incorporated by reference in their entirety.

TECHNICAL FIELD

The invention is based on a method and a device for analyzing the combustion noise during the injection of fuel into a cylinder of an internal combustion engine. It is already known to detect the combustion noise that is caused by the pressure waves during the ignition of the fuel-air mixture in the combustion chamber with the aid of a knock sensor. However, the knock sensor detects not only the direct combustion noises, but also all further interference noises, both of the internal combustion engine itself and also in its environment.

BACKGROUND

It is further known to restrict the interference noises at least partially by activating or evaluating the noise measurement only within a fixed measuring window which is started for example after the injection of a first injection amount and terminated on completion of combustion of a following injection pulse. Although this method brings a certain improvement as regards the evaluation of the detected combustion noise, it still includes a high proportion of undesirable interference noises. Moreover, the fixed measuring window cannot be adjusted to the individual injection pulses with their different injection amounts. However, since the intensity of the combustion noise is a measure for the amount of fuel injected, the interference noises contained in the recorded combustion noise can lead to unreliable results in the evaluation. The known method is therefore to be regarded as critical, for example, for determining an injected amount of fuel.

SUMMARY

A further problem also resides in the fact that, in particular in the adjustment of minimal injection amounts for an internal combustion engine, each individual combustion noise of an injection pulse must be detected as accurately and reliably as possible in order to be able, for example, to precisely analyze the combustion noises between one or more pre-injections and the following main injection. Such requirements are imposed in particular on modern internal combustion engines operating with direct fuel injection such as diesel or petrol engines with piezoelectric injectors in which the injection pulses of a cycle are activated at very short time intervals.

The object underlying the invention is to specify a method and a device by means of which the combustion noise of an internal combustion engine produced during the injection of the fuel can be determined with greater accuracy and reliability. This object can be achieved by a method for analyzing a combustion noise during the injection of fuel into a cylinder of an internal combustion engine, comprising detecting the combustion noise within an injection cycle in a measuring window which corresponds to a rotation angle of a crankshaft of the internal combustion engine, wherein an algorithm is formed by means of which a start and/or end position of the measuring window that is variable as a function of operating parameters is determined for the measuring window in order to register the combustion noise of an individual injection pulse.

The end position of the measuring window can be placed immediately before a start of combustion of a following injection pulse. The start position of the measuring window can be predefined by a fixed length in time or a fixed rotation angle which is counted back from the end position of the measuring window. The measuring window can be started at a start of injection or immediately before a start of combustion of an injection pulse that is to be considered. The start position and/or a length of the measuring window can be determined by analysis of an envelope which is formed from the received combustion noise. At least one local minimum value can be determined by low pass filtering from the envelope which is established over two adjacent injection pulses, for example over a pre-injection and a main injection, a position of said local minimum value being used as the start position for the measuring window. If there are a number of local minimum values, a smallest minimum value can be used as the start position for the measuring window. Taking into account an ignition delay and/or an engine type, the measuring window can be positioned in an interval ±4° crankshaft angle with regard to the start of the combustion noise.

The object can also be achieved by a device for analyzing the combustion noise during an injection of fuel into a cylinder of an internal combustion engine comprising: a knock sensor for recording the combustion noise having an angle sensor for recording the rotation angle of a crankshaft of the internal combustion engine, and a control device comprising a software program with an algorithm, the software program when executed specifying a start and/or end position of a measuring window for an individual combustion noise that is to be recorded, said start and/or end position being variable as a function of operating conditions.

The control device can be embodied to quantify an injected amount of fuel from the amplitude or the intensity of the combustion noise. The control device may record the combustion noise on a directly injecting diesel or petrol engine.

With the inventive method or device for analyzing the combustion noise during the injection of fuel into a combustion chamber of an internal combustion engine having the above mentioned features, there is produced the advantage that essentially the combustion noise of an individual injection pulse is detected. It is regarded as particularly advantageous that the smallest possible measuring window can be formed for the registering of the combustion noise. Said measuring window is not fixed, but is variable and is adjusted to match operating conditions of the internal combustion engine. In this way it is possible, in contrast to the known methods, also to determine a small fuel amount of an individual injection pulse with improved reliability. In contrast, with known methods it can only be established roughly whether an injection or a combustion has taken place or not.

It is regarded as particularly advantageous that the end position of the measuring window is set such that it is no longer possible to record further injection and combustion noises of a following injection pulse. Since the start of a following injection pulse is determined by a control device, this moment in time or a corresponding rotation angle of the crankshaft of the internal combustion engine can easily be advantageously used to close the measuring window only in conjunction with an estimated value for the ignition delay.

This moment in time is determined individually for each injection pulse and can therefore be adapted to the operating conditions of the internal combustion engine.

If the end position for the measuring window is known, it is very easy to determine a start position for the measuring window by counting back and thereby defining its length in time. In this way the measuring window can be optimally adjusted for the injection pulse or to its combustion noise.

An advantageous solution is also seen in setting the start position of the measuring window at the beginning of the injection pulse, since this time is predefined. Alternatively it is provided to place the start position at the beginning of the occurring combustion noise, which can be easily measured for example due to the increasing noise level.

A further advantageous solution for determining the start position and/or the length of the measuring window also consists in evaluating the envelope which can be formed from the combustion noise. The envelope can advantageously be formed by rectification of the received noise signals.

If the envelope is recorded over two adjacent injection pulses, then a simple evaluation with regard to a local minimum can be carried out by means of a low pass filter. The two injection pulses or their combustion noises can be easily differentiated on the basis of the local minimum. This likewise results in a simple solution for specifying the start position/end position of the measuring window.

If several local minimum values occur, the smallest minimum value is chosen for the start position, since this value provides the greatest probability for the start of the combustion noise. Thus, all interference noises that occurred previously are advantageously not recorded.

In practice it has been shown that it is of advantage if the measuring window is started at a crankshaft angle roughly in the range ±4° crk with regard to the start of the injection pulse. At the same time an ignition delay and the specific parameters of an engine type have to be taken into account for the exact specification.

As a result of the optimized detection and evaluation of the combustion noise, the device can determine, with the aid of a comparison table for example, an actually injected amount of fuel from the intensity of the combustion noise. This can be used in particular in the case of diesel and petrol engines operating with direct fuel injection in order, inter alia, to monitor and control the actually injected amount of fuel.

BRIEF DESCRIPTION OF THE DRAWINGS

An exemplary embodiment of the invention is shown in the drawing and is explained in more detail in the following description.

FIG. 1 shows a schematic block diagram of the invention,

FIG. 4 shows a block diagram of an inventive device for detecting and evaluating combustion noises.

DETAILED DESCRIPTION

Figure 2:
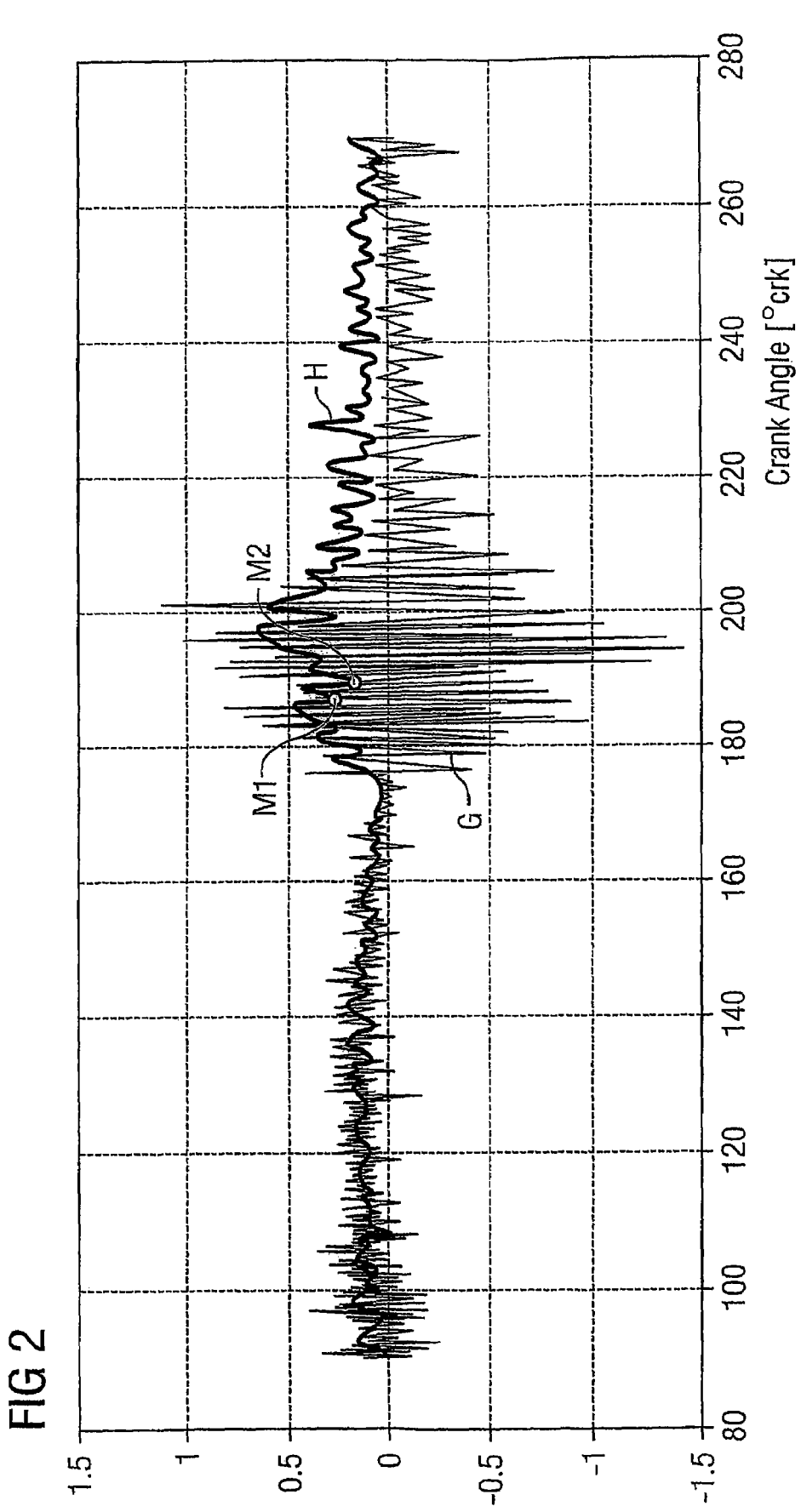
FIG. 2 shows a first diagram in which the noise signals recorded by a knock sensor are depicted together with their envelope.

FIG. 1 shows in a schematic representation an exemplary embodiment of a device according to the invention for analyzing the combustion noise during the injection of fuel into a combustion chamber (cylinder) of an internal combustion engine, said embodiment being represented in the form of a block diagram. Essentially it has an algorithm which is embodied for evaluating the combustion noise detected by a knock sensor. In addition to the actual combustion noises which arise due to ignition of the air-fuel mixture in the combustion chamber or in the cylinder of the internal combustion engine, the depicted noise curve also includes further noises caused, for example, by vibrations of moving parts of the engine (pistons, crankshaft, etc.) or its auxiliary components such as generator, oil and water pump, transmission, powertrain, exhaust, etc. These interference noises overlay the actual combustion noise generated at each injection pulse. In particular diesel and petrol engines with common rail or pump-nozzle injection systems using direct fuel injection operate with finely dosed amounts of fuel which are often delivered in the form of multiple injections within one injection cycle. The control of the individual injection pulses is very complex and demands maximum precision and reliability.

In order to be able to reliably meet the requirements of operating conditions of the internal combustion engine such as emissions, consumption, smooth running, etc., it is necessary, inter alia, that a control device registers the actual amount of fuel injected during an injection pulse and then controls the injection system accordingly. FIG. 1 shows the schematized sequence, which is explained below.

The signal recorded by the knock sensor is initially guided via a rectifier unit 1 in order to form an envelope for the detected combustion noise. It is essential to the invention that the combustion signal is recorded in a measuring window that is individually adjusted for one injection pulse and can be varied according to operating conditions. The measuring window is determined with the aid of an algorithm which in particular specifies a start and an end point. The measuring window is therefore specified with regard to its position and its length relative to the rotation angle of the crankshaft. It is embodied to be as small as possible in order to register practically only the combustion noise which is associated with a selected injection pulse within one injection cycle.

For example, the end point of the measuring window is initially specified such that the measuring window is closed prior to the start of the combustion noise of a following injection pulse. The start point of the measuring window can easily be counted back for a predefined fixed length of the window. By this means the components of the combustion noise before and after the start of the injection pulse (SOI) are recorded.

In a further embodiment of the invention it is provided to place the start point of the measuring window at the start of the combustion noise. This point can be recognized for example by a rise in the envelope curve.

Alternatively it is provided to place the measuring window in such a way that it is active only during the occurrence of the combustion noise and is activated at the start of the combustion noise.

The envelope of the combustion noise obtained from the rectification is subsequently routed to a low pass filter 2. This part of the algorithm determines one or more local minimum values for example by differentiating or filtering the envelope. A local minimum value typically occurs between two injection pulses, for example between a pre-injection and a main injection. It thus localizes the start of the combustion noise.

If a number of local minimum values occur, the smallest local minimum value is filtered out, for example by comparison of the found local minimum values, in a minimum determination unit 3. This absolute local minimum value is then specified for the start of the combustion noise and can then be tapped at the output of the unit 3 for the start point of the measuring window.

It has been shown that the start point of the measuring window relative to the start of injection (SOI) can be changed by a crankshaft angle ±4° crk. In this case an ignition offset of approx. −6° crk also has to be taken into account in the main injection for a corresponding engine type.

As already mentioned, the length of the measuring window can also be varied. If the start point of the measuring window has been determined by analysis of the envelope, a variable window length can be chosen. However, this requires a compensation factor by means of which different, length-dependent signal energies can be made comparable.

The modules 2 and 3 are preferably implemented by means of a software program which is processed by a corresponding device.

The waveform of the unfiltered noise signal G (structure-borne sound signal) recorded by a knock sensor is shown in the first diagram according to FIG. 2. The scaling on the y-axis indicates the amplitude and hence the noise intensity. The rotation angle of the crankshaft in ° crk has been plotted on the x-axis. The curve shown in bold corresponds to the envelope H which was obtained by the rectification.

As can be seen from the diagram, the amplitudes of the noise signal G are particularly strong in the middle range, whereas they run more weakly to the right and left thereof. The middle range of this noise signal G corresponds to that of an injection pulse, for example a main injection, while the waveform at the sides corresponds to the interference signal. The envelope H has a similar shape. Its amplitude is considerably smaller at the edge sides than in the range of the injection pulse. It is also striking that the envelope H has two local minimum values M1, M2 in the middle range, with M2 forming the smallest local minimum value. The two local minimum values can be determined by means of the low pass filter or by derivation of the envelope according to FIG. 1. The smallest local minimum value M2 is thus used as the start of combustion noise (SOC).

Figure 3:
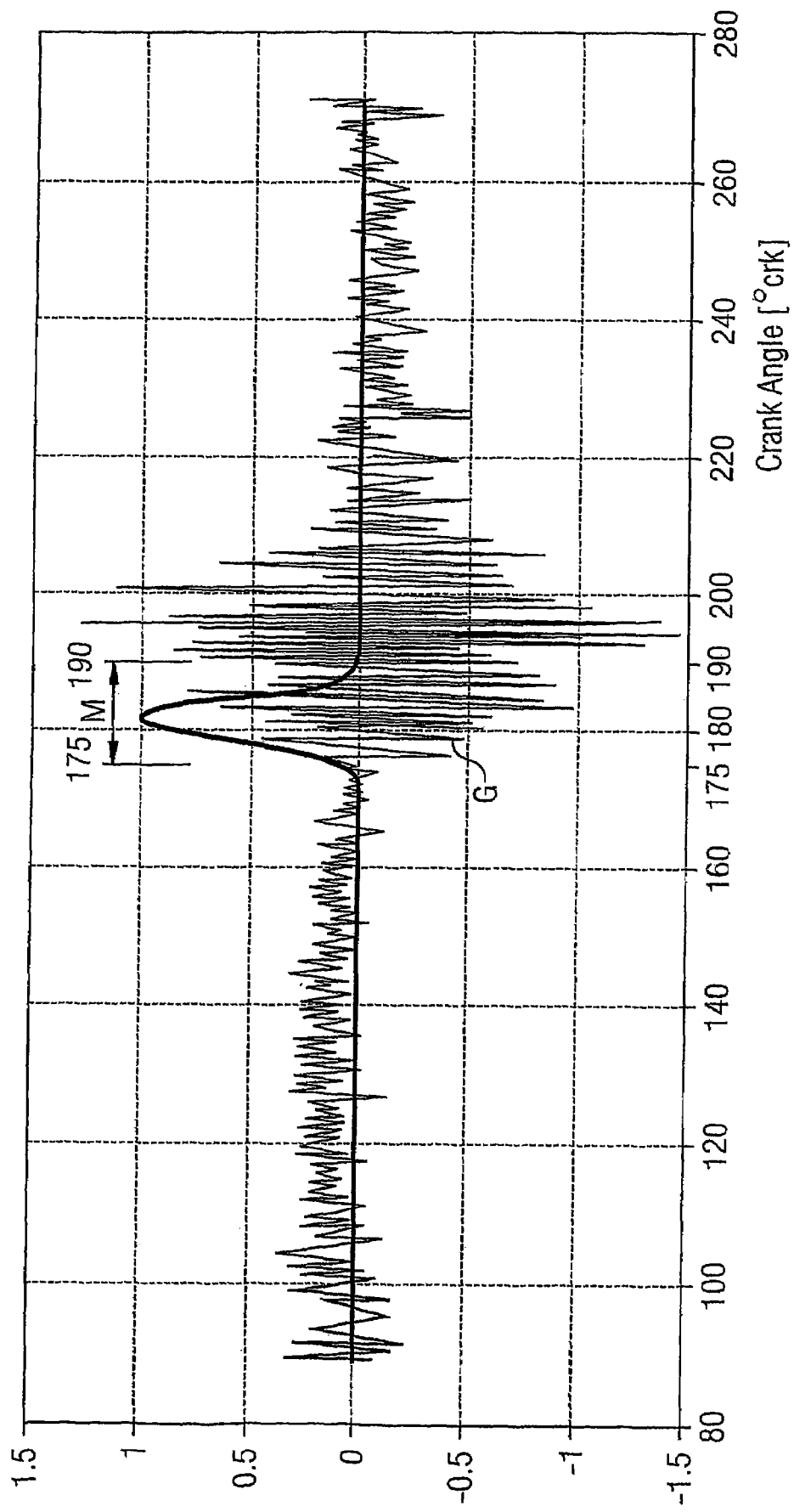
FIG. 3 shows a second diagram of the invention including the representation of the optimized measuring window.

FIG. 3 shows a second diagram in which the noise signals G are again represented as an oscillating curve. The determined measuring window M has also been entered in addition to this curve. As can be seen from FIG. 3, the measuring window M is activated roughly in the range 175 to 190° crk, while all other ranges are suppressed. This range corresponds to the combustion noise of an individual injection pulse of the second cylinder of the internal combustion engine. On the other hand, further injection pulses, as shown somewhat further to the right of the measuring window M in FIG. 3, are suppressed and so cannot influence the evaluation of the combustion noise that is to be considered.

In order to be able to determine the actually injected amount of fuel from the amplitude or the intensity of the combustion noise measured within the measuring window M, reference is made to a comparison table which was previously determined for a specific engine type, specific operating parameters, a specific length of the measuring window M, etc.

FIG. 4 shows a device for analyzing the combustion noise which is represented schematically as a block diagram. A control device 15 is preferably connected via a bus system to a knock sensor 14 which is generally embodied as a structure-borne sound sensor. The knock sensor 14 is arranged at a suitable position of the internal combustion engine 10, ideally in proximity to the cylinder 11. The internal combustion engine 10 has typical modules: at least one cylinder 11 in which a piston 12 is arranged in an alternatingly movable manner and which transfers its kinetic energy via a connecting rod to a crankshaft 18. An injection valve or injector 13 is mounted at a suitable position for the purpose of injecting fuel into the combustion chamber of the cylinder 11. The injector 13 is preferably actuated by a piezoelectric actuator. In this arrangement the fuel flows under high pressure via a feed line 13a into the injector 13.

For the purpose of determining the rotation angle crk of the crankshaft 18, an angle sensor 17 is preferably arranged at a toothed flywheel ring of the crankshaft 18 so that the current rotation angle of the crankshaft 18 can always be precisely determined. The signals of the angle sensor 17 are likewise transferred via the bus system to the control device 15.

The control device 15 has the usual units, such as a program-controlled computer, a memory 16, evaluation units, etc. These units have already been explained in the foregoing. The software program with the algorithm according to the invention, along with the captured or determined data, comparison tables, etc., is stored at least temporarily in the memory 16 for as long as they are needed for the data processing or for control of the internal combustion engine 10.

What is claimed is:

1. A method for analyzing a combustion noise during the injection of fuel into a cylinder of an internal combustion engine, comprising:
   detecting the combustion noise within an injection cycle in a measuring window which corresponds to a rotation angle of a crankshaft of the internal combustion engine, wherein an algorithm is formed by means of which a start and/or end position of the measuring window that is variable as a function of operating parameters is determined for the measuring window in order to register the combustion noise of an individual injection pulse, wherein the start position of the measuring window is predefined by a fixed length in time or a fixed rotation angle which is counted back from the end position of the measuring window.

2. A method according to claim 1, wherein the end position of the measuring window is placed immediately before a start of combustion of a following injection pulse.

3. A method according to claim 1, wherein a length of the measuring window is determined by analysis of an envelope which is formed from the received combustion noise.

4. A method according to claim 3, wherein at least one local minimum value is determined by low pass filtering from the envelope which is established over two adjacent injection pulses, a position of said local minimum value being used as the start position for the measuring window.

5. A method for analyzing a combustion noise during the injection of fuel into a cylinder of an internal combustion engine, comprising:
   detecting the combustion noise within an injection cycle in a measuring window which corresponds to a rotation angle of a crankshaft of the internal combustion engine, wherein an algorithm is formed by means of which a start and/or end position of the measuring window that is variable as a function of operating parameters is determined for the measuring window in order to register the combustion noise of an individual injection pulse, wherein the start position and/or a length of the measuring window is determined by analysis of an envelope which is formed from the received combustion noise, and wherein at least one local minimum value is determined by low pass filtering from the envelope which is established over a pre-injection and a main injection, a position of said local minimum value being used as the start position for the measuring window.

6. A device according to claim 5, wherein the control device is embodied to quantify an injected amount of fuel from the amplitude or the intensity of the combustion noise.

7. A device according to claim 5, wherein the control device records the combustion noise on a directly injecting diesel or petrol engine.

8. A method for analyzing a combustion noise during the injection of fuel into a cylinder of an internal combustion engine, comprising:
   determining a start and/or end position of a measuring window that is variable as a function of operating parameters for the measuring window,
   detecting the combustion noise within an injection cycle in the measuring window which corresponds to a rotation angle of a crankshaft of the internal combustion engine,
   wherein the start position of the measuring window is predefined by a fixed length in time or a fixed rotation angle which is counted back from the end position of the measuring window.

9. A method according to claim 8, wherein the end position of the measuring window is placed immediately before a start of combustion of a following injection pulse.

10. A method according to claim 8, wherein a length of the measuring window is determined by analysis of an envelope which is formed from the received combustion noise.

11. A method according to claim 10, wherein at least one local minimum value is determined by low pass filtering from the envelope which is established over two adjacent injection pulses, a position of said local minimum value being used as the start position for the measuring window.

12. A method for analyzing a combustion noise during the injection of fuel into a cylinder of an internal combustion engine, comprising:
   detecting the combustion noise within an injection cycle in a measuring window which corresponds to a rotation angle of a crankshaft of the internal combustion engine,
   wherein an algorithm is formed by means of which a start and/or end position of the measuring window that is variable as a function of operating parameters is determined for the measuring window in order to register the combustion noise of an individual injection pulse, wherein the start position and/or a length of the measuring window is determined by analysis of an envelope which is formed from the received combustion noise, and wherein if there are a number of local minimum values a smallest minimum value is used as the start position for the measuring window.

13. A method for analyzing a combustion noise during the injection of fuel into a cylinder of an internal combustion engine, comprising:
   detecting the combustion noise within an injection cycle in a measuring window which corresponds to a rotation angle of a crankshaft of the internal combustion engine,
   wherein an algorithm is formed by means of which a start and/or end position of the measuring window that is variable as a function of operating parameters is determined for the measuring window in order to register the combustion noise of an individual injection pulse, wherein, taking into account an ignition delay and/or an engine type, the measuring window is positioned in an interval ±4° crankshaft angle with regard to the start of the combustion noise.

14. A device for analyzing the combustion noise during an injection of fuel into a cylinder of an internal combustion engine comprising: a knock sensor for recording the combustion noise having an angle sensor for recording the rotation angle of a crankshaft of the internal combustion engine, and
   a control device comprising a software program with an algorithm, the software program when executed specifying a start and/or end position of a measuring window for an individual combustion noise that is to be recorded, said start and/or end position being variable as a function of operating conditions, wherein the start position of the measuring window is predefined by a fixed length in time or a fixed rotation angle which is counted back from the end position of the measuring window.

15. A method for analyzing a combustion noise during the injection of fuel into a cylinder of an internal combustion engine, comprising:
   determining a start and/or end position of a measuring window that is variable as a function of operating parameters for the measuring window,
   detecting the combustion noise within an injection cycle in the measuring window which corresponds to a rotation angle of a crankshaft of the internal combustion engine, wherein the start position and/or a length of the measuring window is determined by analysis of an envelope which is formed from the received combustion noise, wherein if there are a number of local minimum values a smallest minimum value is used as the start position for the measuring window.

16. A method for analyzing a combustion noise during the injection of fuel into a cylinder of an internal combustion engine, comprising:
   determining a start and/or end position of a measuring window that is variable as a function of operating parameters for the measuring window, and
   detecting the combustion noise within an injection cycle in the measuring window which corresponds to a rotation angle of a crankshaft of the internal combustion engine, wherein, taking into account an ignition delay and/or an engine type, the measuring window is positioned in an interval ±4° crankshaft angle with regard to the start of the combustion noise.

* * * * *